United States Patent
Tada

(10) Patent No.: US 6,192,219 B1
(45) Date of Patent: Feb. 20, 2001

(54) MESSAGE MANAGEMENT IN WIRELESS SELECTIVE CALL RECEIVER

(75) Inventor: Ken-Ichi Tada, Shizuoka (JP)

(73) Assignee: NEC Corporation, Tokyo (JP)

(*) Notice: Under 35 U.S.C. 154(b), the term of this patent shall be extended for 0 days.

(21) Appl. No.: 09/075,718

(22) Filed: May 11, 1998

(30) Foreign Application Priority Data

May 23, 1997 (JP) .................................................. 9-134008

(51) Int. Cl.[7] ...................................................... H04Q 7/00
(52) U.S. Cl. .................... 455/38.1; 455/31.2; 455/186.1; 340/825.5; 340/825.44
(58) Field of Search ............................... 455/186.1, 31.2, 455/38.1, 31.1, 412, 227, 550; 340/825.44, 825.5

(56) References Cited

FOREIGN PATENT DOCUMENTS

| | | |
|---|---|---|
| 62-268220 | 11/1987 | (JP) . |
| 64-52328 | 3/1989 | (JP) .................................. H04B/7/26 |
| 64-54437 | 4/1989 | (JP) . |
| 3-40651 | 2/1991 | (JP) . |
| 5-183486 | 7/1993 | (JP) . |
| 6-303336 | 10/1994 | (JP) . |
| 7-79464 | 3/1995 | (JP) . |

*Primary Examiner*—Fan Tsang
*Assistant Examiner*—Blane J. Jackson
(74) *Attorney, Agent, or Firm*—Scully, Scott, Murphy & Presser

(57) ABSTRACT

In a wireless selective call receiver, a receiving unit receives a specific message to which a specific attribute is allocated. A determining section determines whether or not the storage unit is full, and designates one of the messages to be deleted based on the specific attribute, when it is determined that the storage unit is full. A message storing section stores the specific message in the storage unit, when it is determined that the storage unit is not full, and deletes the designated message to store the specific message in the storage unit, when it is determined that the storage unit is full.

8 Claims, 7 Drawing Sheets

| MESSAGE No. | 0 | 1 | 2 | 3 | 4 | 5 | 6 | 7 | 8 | 9 |
|---|---|---|---|---|---|---|---|---|---|---|
| MESSAGE ATTRIBUTE | 1 | 1 | 0 | 0 | 1 | 0 | 0 | 0 | 1 | 0 |
| MESSAGE | A | B | C | D | E | F | G | H | I | J |

Fig. 3A

| MESSAGE No. | 0 | 1 | 2 | 3 | 4 | 5 | 6 | 7 | 8 | 9 |
|---|---|---|---|---|---|---|---|---|---|---|
| MESSAGE ATTRIBUTE | X | Y | Y | Z | Z | X | X | Y | X | Z |
| MESSAGE | A | B | C | D | E | F | G | H | I | J |

Fig. 3B

| MESSAGE No. | 0 | 1 | 2 | 3 | 4 | 5 | 6 | 7 | 8 | 9 |
|---|---|---|---|---|---|---|---|---|---|---|
| MESSAGE ATTRIBUTE | X | Y | Z | Z | X | X | Y | X | Z | Y |
| MESSAGE | A | C | D | E | F | G | H | I | J | K |

Fig. 6A

| MESSAGE No. | 0 | 1 | 2 | 3 | 4 | 5 | 6 | 7 | 8 | 9 |
|---|---|---|---|---|---|---|---|---|---|---|
| MESSAGE ATTRIBUTE | X | X | Z | Y | Y | X | X | Z | Z | Y |
| MESSAGE | A | B | C | D | E | F | G | H | I | J |

Fig. 6B

| MESSAGE No. | 0 | 1 | 2 | 3 | 4 | 5 | 6 | 7 | 8 | 9 |
|---|---|---|---|---|---|---|---|---|---|---|
| MESSAGE ATTRIBUTE | X | Z | Y | Y | X | X | Z | Z | Y | Y |
| MESSAGE | B | C | D | E | F | G | H | I | J | K |

MESSAGE MANAGEMENT IN WIRELESS SELECTIVE CALL RECEIVER

BACKGROUND OF THE INVENTION

1. Field of the Invention

The present invention relates to message management in a wireless selective call receiver. More particularly, the present invention relates to message management in a wireless selective call receiver, in which a plurality of messages can be stored in a RAM, and one of the plurality of messages to be deleted can be specified based on the attributes of the messages when the storage capacity of the RAM is full.

2. Description of the Related Art

Conventionally, in the message management in a wireless selective call receiver, each of the messages stored in a RAM is added with protection information indicative of whether the message should be protected, as described in, for example, Japanese Laid Open Utility Model Disclosure (JU-A-Showa 64-54437). In the method, the messages other than the message which should be protected are deleted in accordance with the protection information in a predetermined order, in the case that to empty storage area of the RAM is not present.

FIG. 1A shows a storage mapping diagram of the RAM when management of messages is performed in the conventional wireless selective call receiver. In this example, the number of messages which can be stored in the RAM is 10. That is, ten messages are stored in the storage locations of the message number 0 to the message number 9 in the RAM. When a message is received in the state that any message is not stored in the RAM, the received message is stored in order from the message number 0. When a message is stored in the message number 9 of the RAM, empty storage area is not present.

A message protection flag is provided for each message. The message protection flag is set through a switch operation by a user. In FIG. 1A, messages A–J are stored in the storage locations of the message numbers 0–9 and the messages with the message numbers 0, 1, 4 and 8 are protected.

Next, the processing procedure in the method of managing messages in the conventional wireless selective call receiver is shown in FIG. 1B.

First, when a message issued to the receiver is received (Step S21), it is determined whether or not any empty storage area is present in the message storage RAM (Step S22). If any empty storage area is present, the received message is stored in a storage location with the smallest message number in the empty storage area (Step S23). Then, the processing ends.

On the other hand, when it is detected that there is no empty storage area in the processing of the step S22, the search of a message to be is performed. For this purpose, 0 is set in a variable a for the search of this message to be deleted (Step S24). Then, it is determined whether or not the message with the message number a=0 is a protected message (Step S25). When the message with the message number a=0 is one of the protected messages, 1 is added to the message number a and then the control returns to the step S25 (S26). Subsequently, it is determined in the processing of the step S25 whether or not the message with the message number a=1 is a protected message. This operation is repeated until the message which is allowed to be deleted is found out.

When a message which is allowed to be deleted, that is, does not have a protection flag set is found out in the processing of the step S25, the message with the message number a is deleted (Step S27).

Next, nine remaining messages are rearranged in the storage locations of the message numbers 0 to 8 in the order of older reception time to set the message number 9 to an empty storage location (Step S28). Subsequently, the control advances to the processing of the step S22 and already received message is stored in the RAM in accordance with the processing procedure of the steps S22 and S23. Then, the processing is ended.

There are the following problems in the case of message management in the conventional wireless selective call receiver. The first problem is in that already received call messages to the user himself and so on are deleted when the receiver is set in the operating state without any switch operation and information messages such as news, weather forecast and so on are continuously received. The reason is that the protection of the message can not be performed when the receiver is set in the operating state, because the message protection is executed through a switch operation by the user.

Also, the second problem is in that when information messages with the same attribute are continuously received, the RAM is filled only with the information message with the same attribute. This is because the message to be deleted when the RAM does not have any empty storage area is determined based on the existence or non-existence of the protection designation of each of the stored messages and the reception times of the messages.

In addition to the above reference, a protecting and deleting method of a data in a receiver is described in Japanese Laid Open Patent Disclosure (JP-A-Showa 62-268220). In this reference, when a message with an ID is received and a storage unit is full, a message allowed to be deleted is searched. When the message to be deleted is found, the message is deleted and then the message and the ID are stored. When any message allowed to be deleted is not found, only the ID is stored.

A memory managing system is described in Japanese Laid Open Patent Disclosure (JP-A-Heisei 6-303336). In this reference, a memory 4 for storing messages is divided into a first storage section 4-1 and a second storage section 4-2. Messages from predetermined telephone numbers are stored in the first storage section and the other messages are stored in the second storage section. Alternatively, identification information is added to the messages from the predetermined telephone numbers which are stored in the memory 4 after the messages from the other telephone numbers are deleted.

A speech and data transmission terminal apparatus which is connected to a center apparatus is described in Japanese Laid Open Patent Disclosure (JP-A-Heisei 3-40651). In this reference, a control unit has a function to determine an empty storage area of an information storage medium, and a function to request the stopping of transmission of data to the center apparatus when empty storage area is not present. The control unit has a function to delete a designated content from the information storage medium to prepare an empty storage area and a function to store a received data in the empty storage area.

An information protecting method is described in Japanese Laid Open Patent Disclosure (JP-A-Heisei 7-79464). In this reference, a keyword is prepared to specify a message to be protected. When a received message has the same word portion as the keyword from the head, the received message is stored in a memory.

SUMMARY OF THE INVENTION

The present invention is accomplished in viewpoint from the above problems. Therefore, an object of the present invention is to provide a wireless selective call receiver and a method of managing messages, in which it is possible to protect a message with a specific attribute with a priority.

Another object of the present invention is to provide a wireless selective call receiver and a method of managing messages, in which the attributes of the messages which are stored in a RAM are not prejudiced even if messages with the same attribute are continuously received.

In order to achieve an aspect of the present invention, a wireless selective call receiver includes a receiving unit for receiving a specific message to which a specific attribute is allocated, a storage unit for storing messages, each of which has an attribute, a determining section for determining whether or not the storage unit is full, and designating one of the messages to be deleted based on the specific attribute, when it is determined that the storage unit is full, and a message storing section for storing the specific message in the storage unit, when it is determined that the storage unit is not full, and deleting the designated message to store the specific message in the storage unit, when it is determined that the storage unit is full.

The wireless selective call receiver may further include a message counter for counting a number of messages stored in the storage unit. In this case, the determining section refers to the message counter to determine whether or not the storage unit is full. The message storing section may decrease the message may counter when deleting the designated message and increase the message counter when storing the specific message.

The determining section may search any one of the messages having a same attribute as the specific attribute, when it is determined that the storage unit is full, and designates the message having the oldest reception time as the designated message to be deleted and when any message having the same attribute as the specific attribute is not found. In this case, the wireless selective call receiver may further include an attribute message counter for counting a number of messages stored in the storage unit for each attribute. Also, the determining section may refer to the attribute message counter to determine whether or not the messages having the same attribute as the specific attribute are present. Also, the determining section may designate one of the messages having the same attribute as the specific attribute and having the oldest reception time as the designated message to be deleted, when it is determined that the messages having the same attribute as the specific attribute are found.

When a storage allowable value is allocated to each of the attributes, the determining section may search the attributes for each of which the messages are stored more than the storage allowable value, and designates one of the messages having the oldest reception time and having any one of the searched attributes as the designated message to be deleted, when it is determined that the storage unit is full. In this case, the wireless selective call receiver may further includes an attribute message counter for counting a number of messages stored in the storage unit for each attribute, and an allowable value register for storing a storage allowable value for each of the attributes. The determining section may refer to the allowable value register and the attribute message counter to determine the attributes for each of which the messages are stored more than the storage allowable value.

The messages with the attributes may be stored in the storage unit in order of older reception time. In this case, the determining section may search the designated message to be deleted in order from the message with the oldest reception time. In addition, the message storage section further rearranges the messages in order of older reception time after the designated message is deleted and then stores the specific message in the last.

The attribute may be a title of the message and a call attribute may be allocated to the message when the message is a personal message to a user.

In order to achieve another aspect of the present invention, a method of storing a specific message with a specific attribute while protecting already stored messages in a wireless selective call receiver, includes the steps of:

determining whether or not a storage unit for storing the messages is full;

designating one of the messages to be deleted based on the specific attribute, when it is determined that the storage unit is full;

storing the specific message in the storage unit, when it is determined that the storage unit is not full; and deleting the designated message to store the specific message in the storage unit, when it is determined that the storage unit is full.

According to the present invention, when the empty storage area in the RAM is not present in the wireless selective call receiver, a storage message with the same attribute as the received message from is searched in the RAM and is deleted from the RAM, such that the attributes of the messages stored in the RAM is never prejudiced, even if messages with the same attribute are continuously received.

BRIEF DESCRIPTION OF THE DRAWINGS

FIG. 3A is a storage mapping diagram illustrating the state of the messages which are stored in the RAM before a new message is received in the wireless selective call receiver according to the first embodiment of the present invention;

FIG. 3B is a storage mapping diagram illustrating the state of the messages which are stored in the RAM after the new message is received in the wireless selective call receiver according to the first embodiment of the present invention;

FIG. 6A is a storage mapping diagram illustrating the state of the messages which are stored in the RAM before a new message is received in the wireless selective call receiver according to the other embodiment of the present invention;

FIG. 6B is a storage mapping diagram illustrating the state of the messages which are stored in the RAM after the new message is received in the wireless selective call receiver according to the other embodiment of the present invention.

DESCRIPTION OF THE PREFERRED EMBODIMENTS

Next, the wireless selective call receiver of the present invention will be described with reference to the attached drawings.

First, the wireless selective call receiver according to the first embodiment of the present invention will be described.

Figures 1A, 1B:
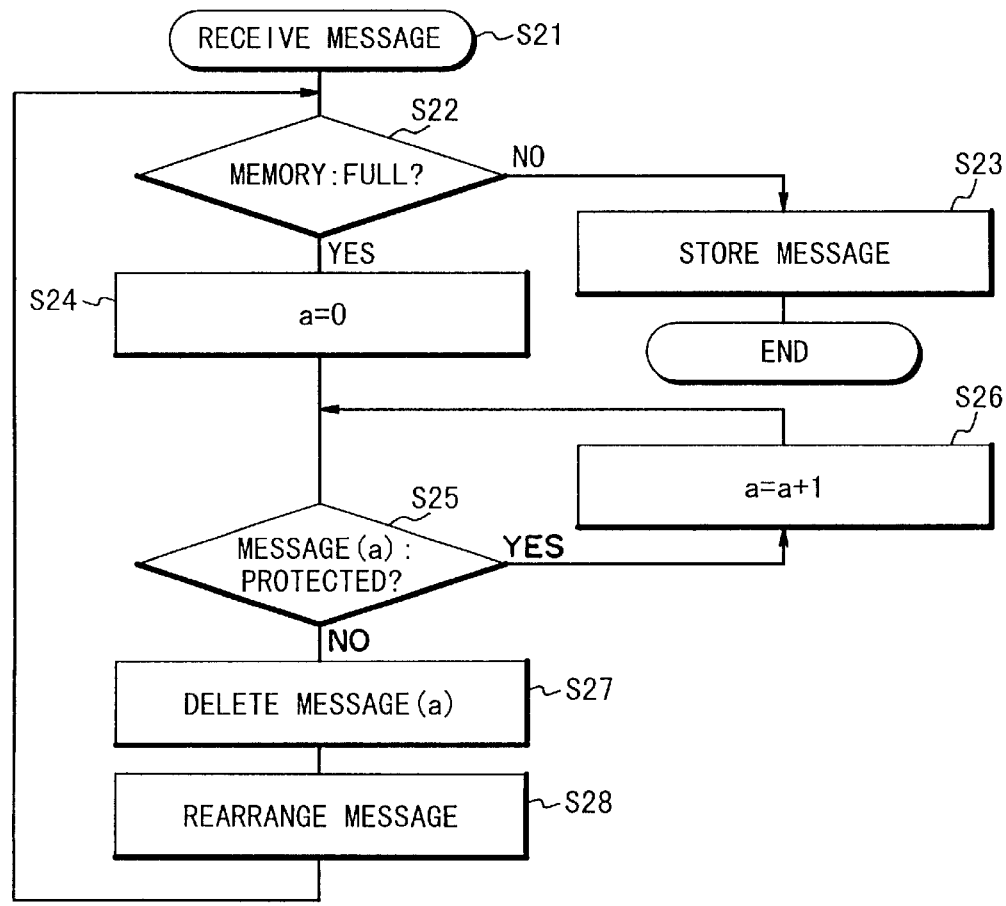
FIG. 1A is a storage mapping diagram of a RAM when management of messages is performed in a conventional wireless selective call receiver.
FIG. 1B is a flow chart illustrating the procedure of a method of managing a message in the conventional wireless selective call receiver.
Figure 2:
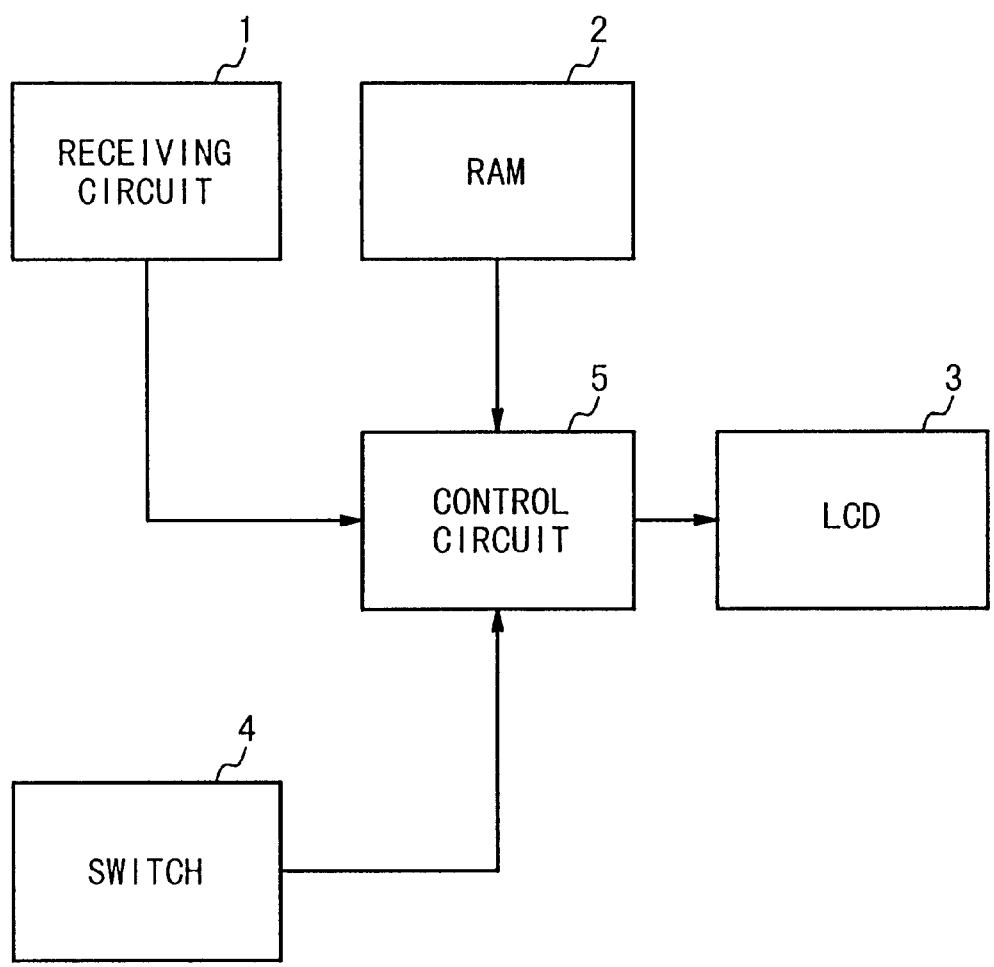
FIG. 2 is a block diagram illustrating the structure of a wireless selective call receiver according to an embodiment of the present invention.

FIG. 2 is a block diagram illustrating the structure of a wireless selective call receiver according to an embodiment of the present invention. Referring to FIG. 2, the wireless selective call receiver is composed of a receiving circuit 1, a RAM 2, an LCD 3, a switch 4 and a control circuit 5. The receiving circuit 1 receives a selective call signal which has been sent out through a wireless channel. The RAM 2 stores a message to the receiver itself. The LCD 3 displays the messages which have been stored in the RAM 2. The switch 4 sets a predetermined function based on the operation input by the user. The control circuit 5 determines whether the storage area of the RAM 2 is full, when the selective call signal is to the receiver itself.

The control circuit 5 searches the messages with the same attribute as a reception message from the already stored messages when it is determined that the storage area of the RAM 2 is full. After deleting the searched message, the control circuit 5 stores the reception message in the empty storage area of the RAM 2.

FIG. 3A is a storage mapping diagram illustrating the state of the messages which are stored in the RAM before a new message K is received in the wireless selective call receiver according to the first embodiment of the present invention. Also, FIG. 3B is a storage mapping diagram illustrating the state of the messages which are stored in the RAM after the new message K is received.

In this case, it is supposed that the message storage RAM can store 10 messages with the storage locations of the message numbers 0 to 9. A data such as a title indicative of the attribute of the message is added to an information message on the originator side. When the information message is received, the title is distinguished (detected) and the information message is allocated with a predetermined attribute corresponding to this distinguished (detected) title. Then, the information message is stored in the RAM 2. Also, when a call message to a user is received, an attribute used to recognize the call message is allocated to the call message. In this example, three attributes of X, Y, Z are present.

In FIG. 3A, ten messages such as message A to J are arranged in order of reception time and stored in the storage locations of the message numbers 0 to 9 of the RAM 2. The message lengths of the ten messages may be different from each other. In other words, the oldest message is stored in the storage location of the message number 0 and there is no empty storage area in the RAM 2. When it is supposed that the message K of the message attribute Y is received in this state, the control circuit 5 deletes the message with the oldest reception time and the message attribute Y. That is, the message B with the attribute Y is deleted. The remaining messages of the message numbers 2 to 9 are rearranged in order of older reception time, as shown in FIG. 3B. The received message is stored in the storage location of the message number 9.

Figure 4:
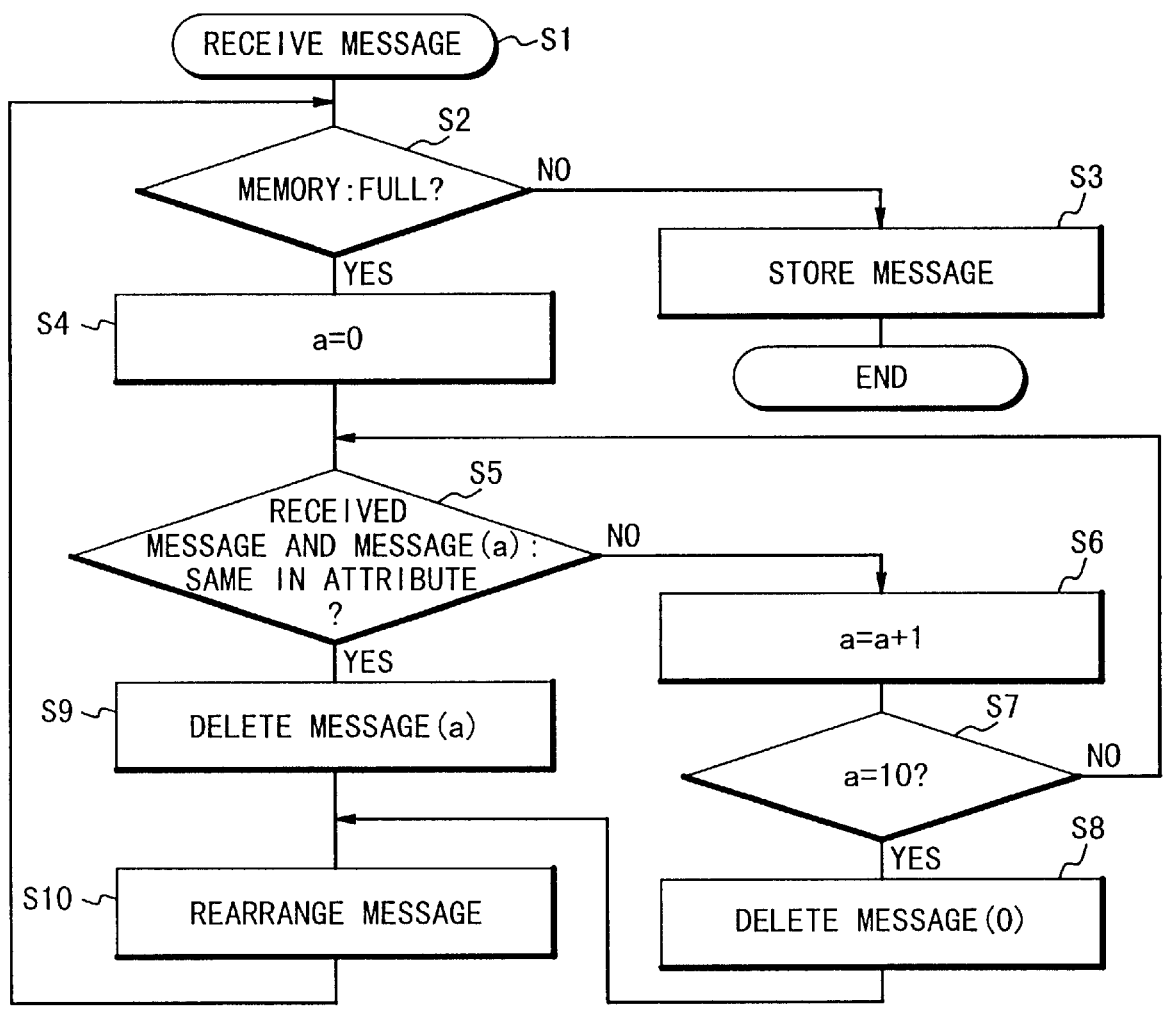
FIG. 4 is a flow chart which shows the procedure of the method of managing a message in the wireless selective call receiver according to the first embodiment of the present invention.

FIG. 4 is a flow chart to explain the procedure of the method of managing a message in the wireless selective call receiver of the present invention.

Referring to FIG. 4, first, when a message to the receiver itself is received (Step S1), it is determined whether or not the RAM for the message storage has an empty storage area (Step S2). If there is an empty storage area, the message is stored in the location with the smallest message number in this empty storage area (Step S3). Then, the processing ends.

On the other hand, when it is detected in the processing of the step S2 that there is not any empty storage area, the search of the message to be deleted is performed.

For this purpose, 0 is set in a variable a for this message search (Step S4) and it is determined whether the attribute of the message with the message number a and the attribute of the received message is same (Step S5). If the attributes are different from each other, 1 is added to the variable a (S6). Subsequently, the determination of whether or not the variable a is 10 is performed (Step S7). If the variable a is 10, a message with the message number 0 having the oldest reception time is deleted (Step S8), because there is not any message with the same attribute in the RAM 2.

Then, the control returns to the processing of step S5, if the variable a is not 10 in the processing of the step S7. In the step S5, it is determined whether or not the message with the message number a has the same attribute as the received message. When any message with the same attribute is found out in the processing of the step S5, the message with the message number a is deleted (Step S9). In this case, the message is detected to have the same attribute in the step S5.

Next, the nine remaining messages are rearranged in order with older reception time and stored in the storage locations of the message numbers 0 to 8. As a result, the message number 9 is set to an empty storage area (Step S10). Subsequently, the control advances to the processing of the step S2 such that the already received message is stored in the RAM 2 in accordance with the processing procedure of the steps S2 and S3. Then, the processing ends.

Next, the wireless selective call receiver according to the second embodiment of the present invention will be described with reference to the drawings.

Figure 5:
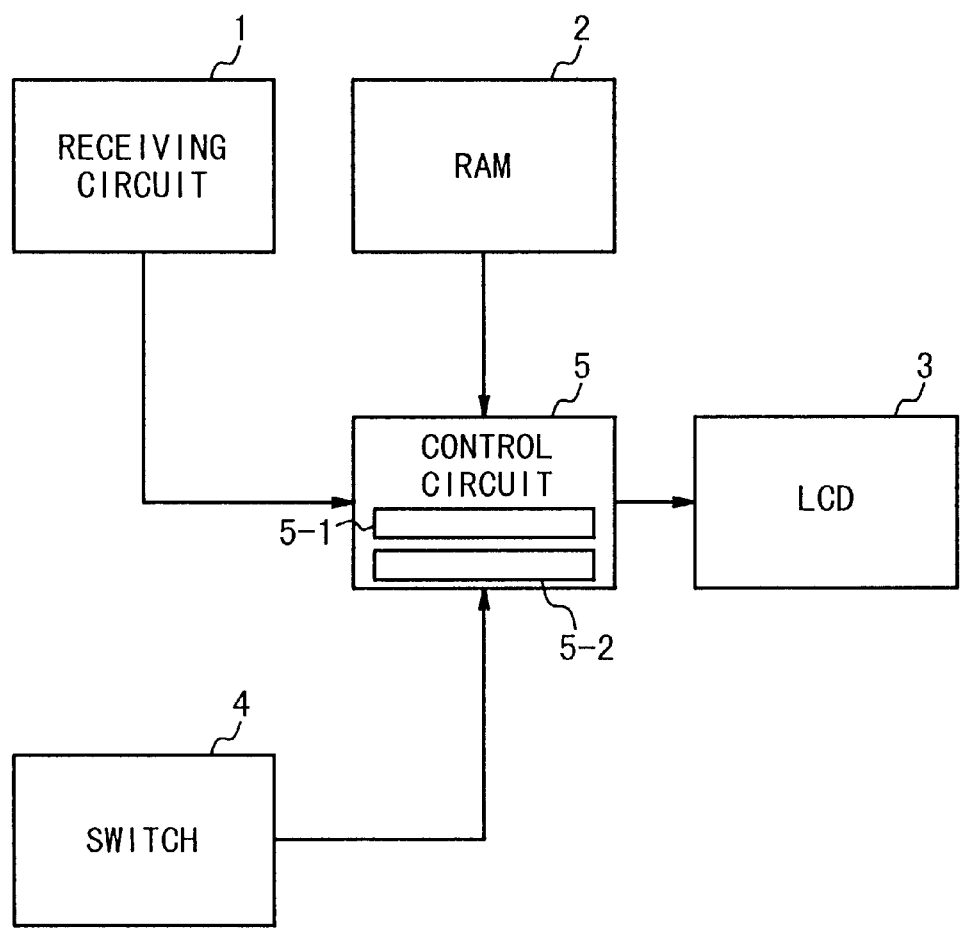
FIG. 5 is a block diagram illustrating the structure of the wireless selective call receiver according to another embodiment of the present invention.

FIG. 5 is a block diagram illustrating the structure of the wireless selective call receiver according to the second embodiment of the present invention. The structure of the wireless selective call receiver according to the second embodiment of the present invention is similar that of the wireless selective call receiver of the first embodiment. The difference point is in that the control circuit 5 has a register set 5-1 which stores protection counts of messages for various attributes and a register set 5-2 which stores the number of messages stored in the RAM 2 for every attribute. Each of the protection counts in the register set 5-1 are set by the user in advance. Each of the contents of the register set 5-2 is incremented by one when the message is stored and decremented by one when the message is deleted.

FIG. 6A is a storage mapping diagram illustrating the state of the messages which are stored in the RAM before a new message K is received in the wireless selective call receiver according to the second embodiment of the present invention. Also, FIG. 6B is a storage mapping diagram illustrating the state of the messages which are stored in the RAM after the new message K is received.

In FIG. 6A, ten messages such as message A to J are arranged in order of reception time and stored in the storage locations of the message numbers 0 to 9 of the RAM 2. The message lengths of the ten messages may be different from each other. In other words, the oldest message is stored in the storage location of the message number 0 and there is no empty storage area in the RAM 2. When it is supposed that the message K of the message attribute Y is received in this state, the control circuit 5 deletes the message with the oldest reception time and having an attribute wherein the number of stored messages with that attribute exceeds the message protection count for that attribute. The remaining messages of the message numbers 2 to 9 are rearranged in order of older reception time, as shown in FIG. 3B. The received message is stored in the storage location of the message number 9.

It is supposed in this example that three message attributes of X, Y, Z are present, and the message protection count can be set for each attribute. The messages protection count is the number of messages to be protected for each attribute and is determined in advance. When the capacity in the RAM 2 is full, the oldest messages which have been stored in the RAM 2 to exceed the message protection count, are primarily deleted. This protection count confirming operation every attribute is performed by the control circuit 5.

Figure 7:
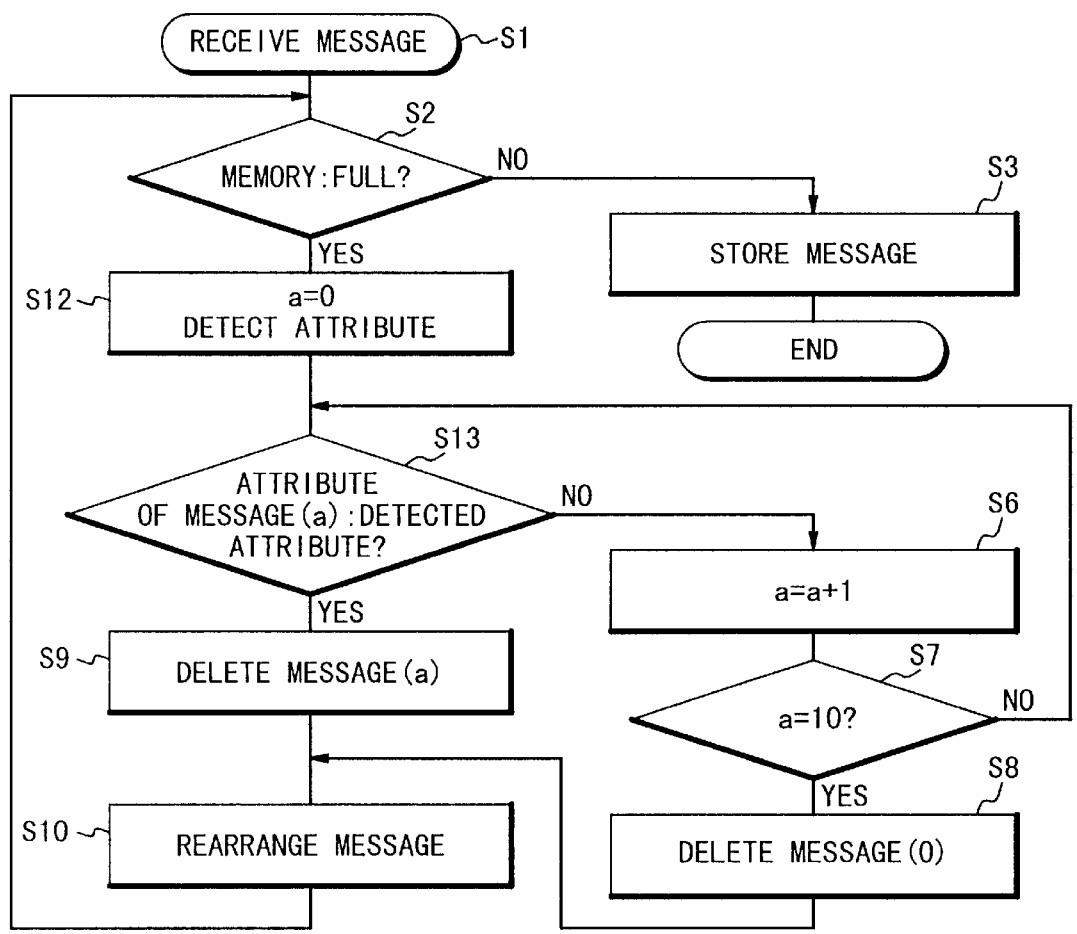
FIG. 7 is a flow chart which shows the procedure of the method of managing a message in the wireless selective call receiver according to the other embodiment of the present invention.

FIG. 7 is a flow chart to explain the procedure of the method of managing a message in the wireless selective call receiver of the present invention.

In this example, for example, the message protection counts are set as 2 for the attribute X, as 3 for the attribute Y and as 1 for the attribute Z. In FIG. 6A, four messages with the attribute X, three messages with the attribute Y and three messages with the attribute Z are already stored in the RAM 2. In this case, it is supposed that the message K with the attribute Y is received. The message to be deleted is the message A of the message number 0 with the attribute X, which is a message with the oldest reception time, and because more messages with the attribute X, than the message protection count are stored in the RAM 2. Then, the message K with the attribute Y is stored in the storage location of the message number 9, as in the first embodiment.

Referring to FIG. 7, first, when a message to the receiver itself is received (Step S1), it is determined whether or not the RAM for the message storage has an empty storage area (Step S2). If there is an empty storage area, the message is stored in the location with the smallest message number in this empty storage area (Step S3). Then, the processing ends.

On the other hand, when it is detected in the processing of the step S2 that there is not any empty storage area, the search of the message to be deleted is performed.

For this purpose, the register sets 5-1 and 5-2 are referred to to determine the attributes with more messages than the protection counts. Also, 0 is set in a variable a for this message search (Step S12) and it is determined whether the attribute of the message with the message number a is one of the determined attributes (with more than the protection count); (Step S13). If the attributes are different from each other, 1 is added to the variable a (S6). Subsequently, the determination of whether or not the variable a is 10 is performed (Step S7). If the variable a is 10, a message with the message number 0 having the oldest reception time is deleted (Step S8), because there is not any message with an attribution having a number of messages more than the protection count in the RAM 2.

Then, the control returns to the processing of step S13, if the variable a is not 10 in the processing of the step S7. In the step S13, it is determined whether or not the message with the message number a has the same attribute as one the determined attributes (with more than the protection count). When any message with the same attribute is found out in the processing of the step S13, the message with the message number a is deleted (Step S9). In this case, the message is detected to have the same attribute in the step S13.

Next, (Step S10) the nine remaining messages are rearranged in order with older reception time and stored in the storage locations of the message numbers 0 to 8. As a result, the message number 9 is set to an empty storage area (Step S10). Subsequently, the control advances to the processing of the step S2 such that the already received message is stored in the RAM 2 in accordance with the processing procedure of the steps S2 and S3. Then, the processing ends.

As described above, according to the present invention, when a message is received in the state in which the RAM for the message storage does not have any empty storage area, the message with the same attribute as that of the received message is searched and deleted from the RAM. Accordingly, even if information messages with the same attribute such as news and weather forecast are continuously received by the wireless selective call receiver, the attribute of the messages stored in the RAM is not prejudiced.

Also, because the protection number of messages can be set for every attribute by the user, the messages with the specific attribute can be primarily protected.

What is claimed is:

1. A wireless selective call receiver which receives information messages transmitted by transmitters, wherein each transmitter adds to the information message attribute data, including a title, which indicates the attribute of the message, comprising:

a receiving unit for receiving a specific message;

means for detecting the added attribute data and on the basis thereof allocating a specific attribute to the specific message, wherein said attribute is a title of said message and a call attribute is allocated to said message when said message is a personal message to a user;

a storage unit for storing stored messages, each of which has an attribute;

determining means for determining whether or not said storage unit is full, and designating one of said stored messages as a designated message to be deleted based on said specific attribute, when it is determined that said storage unit is full;

wherein said determining means searches the attributes of the stored messages and designates (a) a stored message having (i) a same attribute as said specific attribute and also having (ii) the oldest reception time, as said designated message to be deleted, and when a message having said same attribute as said specific attribute is not found, designates (b) a stored message having the oldest reception time, as said designated message to be deleted; and message storing means for storing said specific message in said storage unit when it is determined that said storage unit is not full, and deleting said designated message to store said specific message in said storage unit when it is determined that said storage unit is full.

2. A wireless selective call receiver according to claim 1, further comprising a message counter for counting a number of messages stored in said storage unit, and wherein said determining means refers to said message counter to determine whether or not said storage unit is full.

3. A wireless selective call receiver according to claim 2, wherein said message storing means decreases said message counter when deleting said designated message and increases said message counter when storing said specific message.

4. A wireless selective call receiver according to claim 1, further comprising an attribute message counter for counting a number of messages stored in said storage unit for each attribute, and wherein said determining means refers to said attribute message counter to determine whether or not the messages having the same attribute as said specific attribute are present.

5. A wireless selective call receiver according to claim 1, wherein said messages with said attributes are stored in said storage unit in order of older reception time.

6. A wireless selective call receiver according to claim 5, wherein said determining means searches for said designated message to be deleted in order from the message with the oldest reception time.

7. A wireless selective call receiver according to claim 5, wherein said message storage means further rearranges said messages in order of older reception time after said designated message is deleted and then stores said specific message as the least old reception time.

8. A wireless selective call receiver which receives information messages transmitted by transmitters, wherein each transmitter adds to the information message attribute data, including a titles, which indicates the attribute of the message, comprising:

a receiving unit for receiving a specific message;

means for detecting the added attribute data and on the basis thereof allocating a specific attribute to the specific message;

a storage unit for storing stored messages, each of which has an attribute;

an attribute message counter for counting a number of messages stored in said storage unit for each attribute;

determining means for determining whether or not said storage unit is full, and designating one of said stored messages as a designated message to be deleted based on said specific attribute, when it is determined that said storage unit is full;

message storing means for storing said specific message in said storage unit when it is determined that said storage unit is not full, and deleting said designated message to store said specific message in said storage unit when it is determined that said storage unit is full;

wherein a storage allowable value is allocated to each of said attributes which indicates the number of messages with that attribute which are to be protected;

an allowable value register for storing a storage allowable value for each of said attributes;

wherein said determining means refers to said allowable value register and said attribute message counter to determine the attributes for each of which the messages are stored more than said storage allowable value; and wherein said determining means searches the attributes of the stored messages and designates a message having (a) an attribute wherein the number of stored messages with that attribute exceeds the message protection count for that attribute, and also having (b) the oldest reception time, as said designated message to be deleted, when it is determined that said storage unit is full.

* * * * *

UNITED STATES PATENT AND TRADEMARK OFFICE
CERTIFICATE OF CORRECTION

PATENT NO. : 6,192,219 B1  
DATED : February 20, 2001  
INVENTOR(S) : K. Tada

It is certified that error appears in the above-identified patent and that said Letters Patent is hereby corrected as shown below:

<u>Title page,</u>
Item [56], References Cited, under U.S. PATENT DOCUMENTS, insert

```
--   4,988,991    1/1991  Motegi
     5,258,739   11/1993  DeLuca, et al.
     5,430,440    7/1995  Shim
     5,418,528    5/1995  Hosack, et al. --
```

<u>Column 1,</u>
Line 23, "to empty" should read -- empty --

<u>Column 2,</u>
Line 31, "and" should read -- and the --

<u>Column 4,</u>
Line 24, "the empty" should read -- empty --

<u>Column 7,</u>
Line 15, "full,the" should read -- full, the --

Signed and Sealed this

Sixth Day of August, 2002

*Attest:*

JAMES E. ROGAN
*Attesting Officer*　　*Director of the United States Patent and Trademark Office*